(12) United States Patent
Thompson

(10) Patent No.: US 9,957,408 B2
(45) Date of Patent: May 1, 2018

(54) FREE-RADICAL POLYMERIZATION METHODS AND ARTICLES THEREBY

(71) Applicant: 3M INNOVATIVE PROPERTIES COMPANY, St. Paul, MN (US)

(72) Inventor: Zachary J. Thompson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 308 days.

(21) Appl. No.: 14/776,305

(22) PCT Filed: Mar. 13, 2014

(86) PCT No.: PCT/US2014/026172
§ 371 (c)(1),
(2) Date: Sep. 14, 2015

(87) PCT Pub. No.: WO2014/151650
PCT Pub. Date: Sep. 25, 2014

(65) Prior Publication Data
US 2016/0040026 A1    Feb. 11, 2016

Related U.S. Application Data

(60) Provisional application No. 61/803,237, filed on Mar. 19, 2013.

(51) Int. Cl.
*B32B 15/00* (2006.01)
*B29C 65/00* (2006.01)
(Continued)

(52) U.S. Cl.
CPC ............ *C09D 133/14* (2013.01); *B05D 7/14* (2013.01); *C08F 4/10* (2013.01); *C08F 220/20* (2013.01);
(Continued)

(58) Field of Classification Search
CPC ........ C08F 4/10; C08F 220/20; C08F 220/18; C08F 222/1006; B05D 7/14; C08K 3/22;
(Continued)

(56) References Cited

U.S. PATENT DOCUMENTS 3,347,954 A   10/1967   Bredereck
4,032,596 A   6/1977    Uffner
(Continued)

FOREIGN PATENT DOCUMENTS

CN   H08325465 A   12/1996
CN   1469195 A     1/2004
(Continued)

OTHER PUBLICATIONS

Machine translation of CN 101327945 A, retrieved Sep. 29, 2017.*
(Continued)

*Primary Examiner* — William K Cheung
(74) *Attorney, Agent, or Firm* — Bradford B. Wright

(57) ABSTRACT

A method of curing a free-radically polymerizable composition includes contacting a curable composition with at least one oxide of copper. The curable composition includes: free-radically polymerizable compound; and a beta-dicarbonyl compound represented by the formula (I) or a salt thereof, wherein: $R^1$ and $R^2$ independently represent a hydrocarbyl or substituted-hydrocarbyl group having from 1 to 18 carbon atoms; $R^3$ represents hydrogen, or a hydrocarbyl or substituted-hydrocarbyl group having from 1 to 18 carbon atoms; and each X independently represents O, S, formula (II), or formula (III) wherein each R4 independently represents H or alkyl having from 1 to 18 carbon atoms, or taken together any two of $R^1$, $R^2$, $R^3$; or $R^4$ form a ring. Articles including the cured compositions are also disclosed.
(Continued)

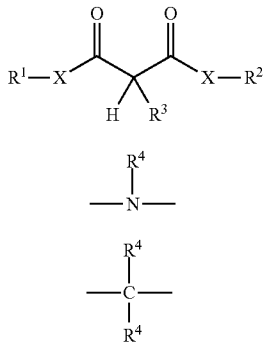

20 Claims, 1 Drawing Sheet

(51) Int. Cl.

| | |
|---|---|
| *B05D 1/40* | (2006.01) |
| *B05D 5/06* | (2006.01) |
| *B05D 5/12* | (2006.01) |
| *C08K 5/34* | (2006.01) |
| *C09D 133/14* | (2006.01) |
| *C08F 4/10* | (2006.01) |
| *C08F 220/20* | (2006.01) |
| *B05D 7/14* | (2006.01) |
| *C08K 3/22* | (2006.01) |
| *C08K 5/14* | (2006.01) |
| *C08K 5/3477* | (2006.01) |
| *C08F 220/18* | (2006.01) |
| *C08F 222/10* | (2006.01) |

(52) U.S. Cl.
CPC ............ *C08K 3/22* (2013.01); *C08K 5/14* (2013.01); *C08K 5/3477* (2013.01); *C08F 220/18* (2013.01); *C08F 222/1006* (2013.01); *C08K 2003/2248* (2013.01)

(58) Field of Classification Search
CPC ............ C08K 5/14; C08K 5/3477; C08K 2003/2248; C09D 133/14
USPC ............ 428/432; 156/60; 427/331, 64, 99.4; 524/101
See application file for complete search history.

(56) References Cited

U.S. PATENT DOCUMENTS

| | | | |
|---|---|---|---|
| 4,356,296 A | 10/1982 | Griffith | |
| 4,642,126 A | 2/1987 | Zador | |
| 4,648,843 A | 3/1987 | Mitra | |
| 4,652,274 A | 3/1987 | Boettcher | |
| 4,665,217 A | 5/1987 | Reiners | |
| 4,752,338 A | 6/1988 | Reiners | |
| 5,026,902 A | 6/1991 | Fock | |
| 5,076,844 A | 12/1991 | Fock | |
| 5,252,629 A | 10/1993 | Imai | |
| 5,739,230 A | 4/1998 | Yuasa et al. | |
| 6,323,283 B1 | 11/2001 | Apostolo et al. | |
| 6,552,140 B1 | 4/2003 | Kneafsey | |
| 6,852,775 B1 | 2/2005 | Soglowek | |
| 2003/0215635 A1 | 11/2003 | Johnston | |
| 2009/0192239 A1 | 7/2009 | Hecht | |
| 2011/0313078 A1 | 12/2011 | Vogt | |

FOREIGN PATENT DOCUMENTS

| | | | |
|---|---|---|---|
| CN | 101327945 A | * | 12/2008 |
| CN | 101573661 A | | 11/2009 |
| CN | 102112095 A | | 6/2011 |
| CN | 102327642 A | | 1/2012 |
| GB | 1293209 | | 10/1972 |
| GB | 1417088 | | 12/1975 |
| JP | H05-345806 | | 12/1993 |
| JP | 2005-255654 | | 9/2005 |
| JP | 2005255654 A | * | 9/2005 |
| JP | 2006-183013 | | 7/2006 |
| JP | 2009-102640 | | 5/2009 |
| JP | 2009-295895 | | 12/2009 |
| WO | WO 2000-38619 | | 7/2000 |
| WO | WO 2000-42092 | | 7/2000 |
| WO | WO 2001-07444 | | 2/2001 |
| WO | WO 2001-92271 | | 12/2001 |
| WO | WO 2002-77043 | | 10/2002 |
| WO | WO 2013-126377 | | 8/2013 |

OTHER PUBLICATIONS

Bredereck, "Autoxidation of CH-active polymerization initiators XIVth Report: Polymerizations and Polymerization Inhibitors" Die Makromoleculare Chemie, 1966, vol. 99, No. 2304, pp. 96-102.
Bredereck, "Regarding CH-active polymerization initiators", Die Makromoleculare Chemie, 1966, vol. 92, pp. 70-90.
Rosen, "Single-Electron Transfer and Single-Electron Transfer Degenerative Chain Transfer Living Radical Polymerization", Chemical Reviews, 2009, vol. 109, pp. 5069-5119.
International Search Report for PCT International Application No. PCT/US2014/126172 dated Jul. 22, 2014, 3pgs.

* cited by examiner

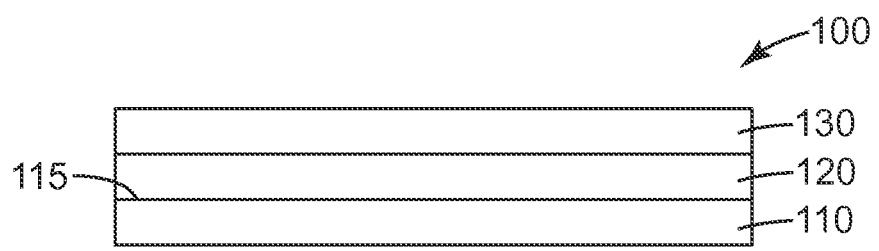

FREE-RADICAL POLYMERIZATION METHODS AND ARTICLES THEREBY

This application is a U.S. National Stage application of International Application No. PCT/US2014/026172, filed Mar. 13, 2014, which claims priority to U.S. Provisional Application No. 61/803,237, filed Mar. 19, 2013, the contents of each of which is hereby incorporated herein by reference.

TECHNICAL FIELD

The present disclosure relates broadly to free-radical polymerization and free-radically polymerizable curable compositions.

BACKGROUND

Many vinyl compounds are polymerizable by free-radicals. Examples include acrylates and methacrylates, acrylamides and methacrylamides, allyl ethers, and styrenes.

Free-radical polymerization of vinyl compound(s) using certain beta-dicarbonyl (i.e., 1,3-dicarbonyl) compounds in the presence of a peroxide and/or oxygen, a halide salt, and a copper compound such as copper acetylacetonate, has been described in U.S. Pat. No. 3,347,954 (Bredereck et al.). Such compositions cause free-radical polymerization of the vinyl compound(s) over time, with shorter times generally being preferred. Since the compositions are spontaneously reactive, it is common practice to provide them as a two-part system such as, for example, a part A and a part B that are combined immediately prior to use.

Organocopper compounds such as copper acetylacetonate may contain copper in a +1 or +2 oxidation state, and typically have good solubility in many organic systems. However, a typical problem of including such copper compounds in curable compositions is that they are prone to color formation, and may not be suitable for use in applications where absence of color is desirable for aesthetic and/or functional reasons.

SUMMARY

The present inventor has discovered a method of polymerizing vinyl compounds using oxygen-activated free-radical initiator systems wherein a copper oxide-based initiator system is used to initiate cure. According to the method, polymerization can be achieved with little or no unwanted color associated with organocopper compounds. Further, the method can be practiced in a manner wherein the catalyst is deposited as a very thin (typically optically transparent) layer on a surface of one or more substrates which are then bonded by placing a curable composition between them, thereby causing it to cure. Accordingly, very good pot-life can be achieved, and there is no need for a last-minute mixing step in order to cause polymerization.

In one aspect, the present disclosure provides a method comprising:
a) providing a curable composition comprising:
at least one free-radically polymerizable compound; and
a beta-dicarbonyl compound represented by the formula

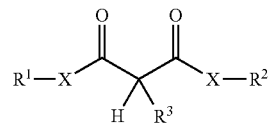

or a salt thereof, wherein:
R¹ and R² independently represent hydrocarbyl or substituted-hydrocarbyl group having from 1 to 18 carbon atoms;
R³ represents hydrogen, or a hydrocarbyl or substituted-hydrocarbyl group having from 1 to 18 carbon atoms; and
each X independently represents O, S,

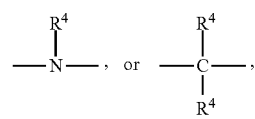

wherein each R⁴ independently represents H or alkyl having from 1 to 18 carbon atoms, or taken together any two of R¹, R², R³, or R⁴ form a ring; and
b) contacting the curable composition with at least one oxide of copper, thereby causing at least partial curing of the curable composition.

In another aspect the present disclosure provides a method of forming an article, the method comprising:
providing a first substrate having a surface, wherein at least a portion of the surface of the first substrate comprises at least one oxide of copper; and
contacting a curable composition with the at least one oxide of copper whereby the curable composition at least partially cures, and wherein the curable composition comprises:
at least one free-radically polymerizable compound; and
a beta-dicarbonyl compound represented by the formula

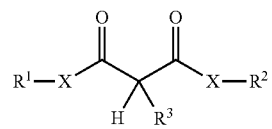

or a salt thereof, wherein:
R¹ and R² independently represent hydrocarbyl or substituted-hydrocarbyl group having from 1 to 18 carbon atoms;
R³ represents hydrogen, or a hydrocarbyl or substituted-hydrocarbyl group having from 1 to 18 carbon atoms; and
each X independently represents O, S,

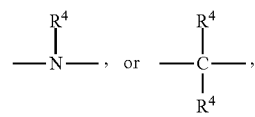

wherein each $R^4$ independently represents H or alkyl having from 1 to 18 carbon atoms, or taken together any two of $R^1$, $R^2$, $R^3$, or $R^4$ form a ring.

In yet another aspect the present disclosure provides an article comprising:
a first substrate having a surface, wherein at least a portion of the surface of the first substrate comprises at least one oxide of copper; and
a reaction product of components comprising:
the at least one oxide of copper;
at least one free-radically polymerizable compound; and
a beta-dicarbonyl compound represented by the formula

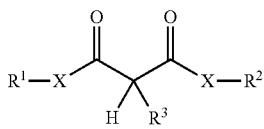

or a salt thereof, wherein:
$R^1$ and $R^2$ independently represent hydrocarbyl or substituted-hydrocarbyl group having from 1 to 18 carbon atoms;
$R^3$ represents hydrogen, or a hydrocarbyl or substituted-hydrocarbyl group having from 1 to 18 carbon atoms; and
each X independently represents O, S,

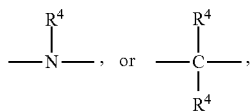

wherein each $R^4$ independently represents H or alkyl having from 1 to 18 carbon atoms, or taken together any two of $R^1$, $R^2$, $R^3$, or $R^4$ form a ring.

As used herein, the prefix "(meth)acryl" refers to acryl and/or methacryl. For example, (meth)acrylate refers to acrylate and/or methacrylate.

As used herein, the term "hydrocarbyl" refers to a monovalent group derived from a hydrocarbon. Examples include methyl, phenyl, and methylcyclohexyl.

As used herein, the term "hydrocarbylene" refers to a divalent group derived from a hydrocarbon. Examples include methylene, phenylene, and 1,3-propane-diyl.

Features and advantages of the present disclosure will be further understood upon consideration of the detailed description as well as the appended claims.

BRIEF DESCRIPTION OF THE DRAWINGS

The FIGURE is a schematic side view of an exemplary article according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The FIGURE may not be drawn to scale.

DETAILED DESCRIPTION

The present disclosure concerns methods for curing free-radically polymerizable compositions using a copper oxide-based initiator system. Curing is effected by free-radical polymerization once copper oxide is brought into contact with the curable composition.

The curable composition comprises at least one free-radically polymerizable compound, which may comprise at least one of (meth)acrylates, (meth)acrylamides, other vinyl compounds, and combinations thereof. Useful free-radically polymerizable compounds may comprise an ethylenically-unsaturated compound having one or more (e.g., one, two, three, four, or more) free-radically polymerizable groups.

Examples of suitable (meth)acrylates include mono-, di-, and poly-(meth)acrylates and (meth)acrylamides such as, for example, 1,2,4-butanetriol tri(meth)acrylate, 1,3-butylene glycol di(meth)acrylate, 1,3-propanediol di(meth)acrylate, 1,4-butanediol di(meth)acrylate, 1,4-cyclohexanediol di(meth)acrylate, 1,6-hexanediol di(meth)acrylate, 1,6-hexanediol monomethacrylate monoacrylate, 2-phonexy-ethyl (meth)acrylate, alkoxylated cyclohexanedimethanol di(meth)acrylates, alkoxylated hexanediol di(meth)acrylate, alkoxylated neopentyl glycol di(meth)acrylate, allyl (meth) acrylate, bis[1-(2-(meth)acryloxy)]-p-ethoxyphenyldimethylmethane, bis[1-(3-(meth)acryloxy-2-hydroxy)]-p-propoxyphenyldimethylmethane, caprolactone modified dipentaerythritol hexa(meth)acrylate, caprolactone modified neopentyl glycol hydroxypivalate di(meth)acrylate, cyclohexanedimethanol di(meth)acrylate, diethylene glycol di(meth)acrylate, dipentaerythritol penta(meth)acrylate, dipropylene glycol di(meth)acrylate, ditrimethylolpropane tetra(meth)acrylate, ethoxylated (10) bisphenol A di(meth)acrylate, ethoxylated (20) trimethylolpropane tri(meth)acrylate, ethoxylated (3) bisphenol A di(meth)acrylate, ethoxylated (3) trimethylolpropane tri(meth)acrylate, ethoxylated (30) bisphenol A di(meth)acrylate, ethoxylated (4) bisphenol A di(meth)acrylate, ethoxylated (4) pentaerythritol tetra(meth)acrylate, ethoxylated (6) trimethylolpropane tri(meth) acrylate, ethoxylated (9) trimethylolpropane tri(meth)acrylate, ethoxylated bisphenol A di(meth)acrylate, ethyl (meth) acrylate, ethylene glycol di(meth)acrylate, 2-ethylhexyl (meth)acrylate, glycerol tri(meth)acrylate, hydroxypivalaldehyde modified trimethylolpropane di(meth)acrylate, isobornyl (meth)acrylate, isopropyl (meth)acrylate, methyl (meth)acrylate, neopentyl glycol di(meth)acrylate, n-hexyl (meth)acrylate, pentaerythritol tetra(meth)acrylate, pentaerythritol tri(meth)acrylate, polyethylene glycol (200) di(meth)acrylate, polyethylene glycol (400) di(meth)acrylate, polyethylene glycol (600) di(meth)acrylate, propoxylated (3) glyceryl tri(meth)acrylate, propoxylated (3) trimethylolpropane tri(meth)acrylate, propoxylated (5.5) glyceryl tri(meth)acrylate, propoxylated (6) trimethylolpropane tri(meth)acrylate), propoxylated neopentyl glycol di(meth)acrylate, sorbitol hexa(meth)acrylate, stearyl (meth)acrylate, tetraethylene glycol di(meth)acrylate, tetrahydrofurfuryl (meth)acrylate, tricyclodecane-dimethanol di(meth)acrylate, triethylene glycol di(meth)acrylate, trimethylolpropane tri(meth)acrylate, tripropylene glycol di(meth)acrylate, tris(2-hydroxyethyl)isocyanurate tri(meth)acrylate, (meth)acrylamide, N,N-dimethylacrylamide, N-vinylpyrrolidone, N-vinylcaprolactam, methylene bis (meth)acrylamide, diacetone (meth)acrylamide, urethane (meth)acrylates, polyester (meth)acrylates, epoxy (meth)

acrylates, copolymerizable mixtures of (meth)acrylated monomers such as those in U.S. Pat. No. 4,652,274 (Boettcher et al.), (meth)acrylated oligomers such as those of U.S. Pat. No. 4,642,126 (Zador et al.), and poly(ethylenically-unsaturated) carbamoyl isocyanurates such as those disclosed in U.S. Pat. No. 4,648,843 (Mitra).

Examples of suitable free-radically polymerizable vinyl compounds include styrene, diallyl phthalate, divinyl succinate, divinyl adipate, and divinyl phthalate. Other suitable free-radically polymerizable compounds include siloxane-functional (meth)acrylates as disclosed, for example, in WO 00/38619 (Guggenberger et al.), WO 01/92271 (Weinmann et al.), WO 01/07444 (Guggenberger et al.), WO 00/42092 (Guggenberger et al.), and fluoropolymer-functional (meth) acrylates as disclosed, for example, in U.S. Pat. No. 5,076,844 (Fock et al.), U.S. Pat. No. 4,356,296 (Griffith et al.), EP 0 373 384 (Wagenknecht et al.), EP 0 201 031 (Reiners et al.), and EP 0 201 778 (Reiners et al.).

Suitable free-radically polymerizable compounds may contain hydroxyl groups and free-radically active functional groups in a single molecule. Examples of such materials include hydroxyalkyl (meth)acrylates such as 2-hydroxyethyl (meth)acrylate and 2-hydroxypropyl (meth)acrylate, glycerol mono- or di-(meth)acrylate, trimethylolpropane mono- or di-(meth)acrylate, pentaerythritol mono-, di-, and tri-(meth)acrylate, sorbitol mono-, di-, tri-, tetra-, or penta-(meth)acrylate, and 2,2-bis[4-(2-hydroxy-3-methacryloxy-propoxy)phenyl]-propane (bisGMA).

Suitable free-radically polymerizable compounds are available from a wide variety of commercial sources such as, for example, Sartomer Co., Exton, Pennsylvania, or can be made by known methods.

Typically, the curable composition includes a sufficient quantity of free-radically polymerizable compound(s) to provide the desired setting or hardening rate and desired overall properties following curing/hardening. Mixtures of free-radically polymerizable compounds can be used if desired.

The curable composition comprises a beta-dicarbonyl compound represented by the formula

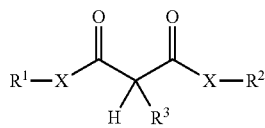

or a salt thereof.

In some embodiments, $R^1$ and $R^2$ independently represent a hydrocarbyl group having from 1 to 18 carbon atoms. Exemplary groups $R^1$ and $R^2$ include methyl, ethyl, isopropyl, n-propyl, butyl, pentyl, hexyl, octyl, decyl, dodecyl, hexadecyl, and octadecyl. In some embodiments, $R^1$ and $R^2$ taken together form a ring. In those embodiments, $R^1$ and $R^2$ taken together may represent, for example: a divalent group selected from hydrocarbylene groups having from 1 to 4, 6, or 8 carbon atoms; a carbonyl group; —O—, —S—

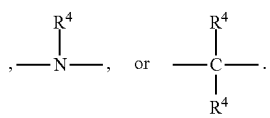

$R^3$ represents hydrogen or a hydrocarbyl group having from 1 to 18 carbon atoms. Exemplary groups $R^3$ include methyl, ethyl, isopropyl, n-propyl, butyl, pentyl, hexyl, octyl, decyl, dodecyl, hexadecyl, and octadecyl.

Each X independently represents O, S,

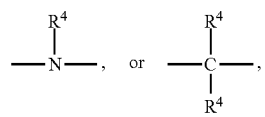

wherein $R^4$ is as described below.

Each $R^4$ may independently represent H or an alkyl group having from 1 to 18 carbon atoms. Exemplary groups $R^4$ include methyl, ethyl, isopropyl, n-propyl, butyl, pentyl, hexyl, octyl, decyl, dodecyl, hexadecyl, and octadecyl.

In some embodiments, the beta-dicarbonyl compound comprises barbituric acid (i.e., $R^3$=H, both

wherein $R^4$=H, and taken together $R^1$ and $R^2$=carbonyl) or a derivative thereof (e.g., a 1,3-dialkylbarbituric acid). Examples of suitable barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propyl-barbituric acid, 5-ethylbarbituric acid, 5-propylbarbituric acid, 5-butylbarbituric acid, 1-benzyl-5-phenylbarbituric acid, and 1-cyclohexyl-5-ethylbarbituric acid.

Optionally, but preferably, the curable composition may further comprise one or more organic peroxides (e.g., mono- or multi-functional carboxylic acid peroxyesters), which typically act to decrease the cure time of the curable composition. Commercially available organic peroxides include, for example, t-alkyl esters of peroxycarboxylic acids, t-alkyl esters of monoperoxydicarboxylic acids, di(t-alkyl) esters of diperoxydicarboxylic acids, alkylene diesters of peroxycarboxylic acids, dialkyl peroxydicarbonates, and OO-t-alkyl O-alkyl diesters of monoperoxycarbonic acid. Exemplary organic peroxides include diisopropyl peroxydicarbonate, t-butyl peroxyneodecanoate, t-amyl peroxyneodecanoate, maleic acid t-butyl monoperoxyester, t-butyl peroxybenzoate, t-butyl peroxy-2-ethylhexanoate, t-amyl peroxy-2-ethylhexanoate, O-isopropyl O,O-t-butyl monoperoxycarbonate, dicyclohexyl peroxycarbonate, dimyristyl peroxycarbonate, dicetyl peroxycarbonate, di(2-ethylhexyl) peroxycarbonate, O,O-t-butyl O-2-ethylhexyl peroxycarbonate, t-butyl peroxy-3,5,5-trimethylhexanoate, t-amyl peroxybenzoate, t-butyl peroxyacetate, di(4-t-butylcyclohexyl) peroxycarbonate, cumyl peroxyneodecanoate, t-amyl peroxypivalate, and t-butyl peroxypivalate.

In some embodiments, the curable composition may contain little or no organic peroxide. For example the curable composition may be essentially free of (e.g., contain less than 1 percent by weight of, less than 0.1 percent by weight of, or even contain less than 0.01 percent by weight of) organic peroxide.

Optionally, but preferably, the curable composition further comprises a quaternary ammonium halide that is at least partially soluble in the curable composition. The quaternary ammonium halide may accelerate the free-radical polymerization rate. Suitable quaternary ammonium halides include those having four hydrocarbyl (e.g., alkyl, alkenyl, cycloalkyl, aralkyl, alkaryl, and/or aryl) groups. Preferably, the hydrocarbyl groups are independently selected from hydrocarbyl groups having from 1 to 18 carbon atoms, more preferably 1 to 12 carbon atoms, and more preferably 1 to 4 carbon atoms. Examples of suitable hydrocarbyl groups include methyl, ethyl, propyl, butyl, hexyl, octyl, dodecyl, hexadecyl, and octad3ecyl, benzyl, phenyl, tolyl, cyclohexyl, and methylcyclohexyl. Exemplary suitable quaternary ammonium compounds include tetramethylammonium halides, tetraethylammonium halides, tetrapropylammonium halides, tetrabutylammonium halides, ethyltrimethylammonium halides, diethyldimethylammonium halides, trimethylbutylammonium halides, and benzyltributylammonium halides. Any halide (e.g., F, Cl, Br, I) ion may be used in the quaternary ammonium halide, but preferably the halide ion is chloride or bromide.

Curable compositions according to the present disclosure may optionally include additives such, as for example, one or more fillers, thickeners, fragrances, hindered amine light stabilizers (HALS), UV stabilizers, inhibitors (e.g., which may accompany free-radically polymerizable compounds), colorants, coating aids, thixatropes, coupling agents, toughening agents, or a combination thereof. Examples of fillers include silica, clays, and surface modified clays. Exemplary toughening agents include elastomeric materials such as various synthetic rubbers (e.g., methyl methacrylate-butadiene-styrene (MBS) copolymers, acrylonitrile-butadiene-styrene (ABS) copolymers, linear polyurethanes, acrylonitrile-butadiene rubbers, styrene-butadiene rubbers, chloroprene rubbers, butadiene rubbers, and natural rubbers. Among them, acrylonitrile-butadiene rubbers are particularly useful because of their typically good solubility in the curable composition. Tougheners may be used alone or in combination.

The curable composition is brought into contact with copper oxide to cause at least partial curing of the curable composition. As used herein, the term "copper oxide" includes any oxide of copper or mixture of oxides of copper. Examples of copper oxides include cuprous oxide ($Cu_2O$), cupric oxide (CuO), and mixtures thereof. Copper oxides are readily available commercially, typically as fine powder or crystals. Optionally, heating of the curable composition while in contact with copper oxide may be carried out, although this is generally not necessary.

In some embodiments, the copper oxide is provided as a copper oxide layer on the surface of copper metal. This may be highly advantageous depending on the application. For example, if using the curable composition to encapsulate a copper electrical circuit trace or copper wire, the copper oxide is already present on the surface of the copper and need not be imaged. Similarly, techniques for vapor deposition of copper metal (e.g., by sputtering, electroless plating, or thermal vapor deposition) are well known in the art. The resultant films are typically highly uniform and can be made to virtually any thickness. In some useful embodiments, vapor-deposited copper films are essentially optically transparent at visible wavelengths, yet they are still effective to at least partially cure the curable composition. Vapor deposited copper films between about 1 nm and about 70 nm in thickness are typically transparent, although other thicknesses may also be transparent.

Accordingly, in one useful embodiment, copper metal is disposed on a surface of a substrate (e.g., by vapor deposition, lamination, or electroless plating), wherein a copper oxide layer spontaneously forms in air, resulting in the substrate having a layer of copper oxide on at least a portion of its surface. Of course, if the substrate itself is made of copper, the copper oxide will already be disposed on the surface. The curable composition is coated onto the copper metal, thereby causing at least partial curing. Any uncured material can be removed, if desired, for example, by rinsing with solvent or by evaporation.

In another useful embodiment, copper metal is disposed adjacent to a surface of a first substrate (e.g., by vapor deposition lamination or electroless plating). The curable composition is coated on a surface of second substrate, and the two substrates are brought together so as to sandwich the curable composition therebetween (i.e., the curable composition contacts both substrates and disposed between them), thereby causing curing of the curable composition and bonding the two substrates together, as shown in the FIGURE.

Referring now to the FIGURE, composite article 100 comprises first substrate 110 having surface 115 comprising at least one oxide of copper and optional second substrate 130. Layer 120 comprising a reaction product of the curable composition and the copper oxide is disposed on surface 115. Layer 120 is disposed between first substrate 110 and second substrate 130.

Exemplary substrates useful in practicing the above embodiments include glass (e.g., as plates, sheets, windows, or electronic display windows (e.g., LCD display or plasma display), flexible circuits, circuit boards, plumbing, plastic (e.g., as films or sheets), metal, ceramic, silicon, and substrates made of copper.

Select Embodiments of the Present Disclosure

In a first embodiment, the present disclosure provides a method comprising:
a) providing a curable composition comprising:
at least one free-radically polymerizable compound; and
a beta-dicarbonyl compound represented by the formula

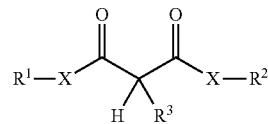

or a salt thereof, wherein:
$R^1$ and $R^2$ independently represent hydrocarbyl or substituted-hydrocarbyl group having from 1 to 18 carbon atoms;
$R^3$ represents hydrogen, or a hydrocarbyl or substituted-hydrocarbyl group having from 1 to 18 carbon atoms; and
each X independently represents O, S,

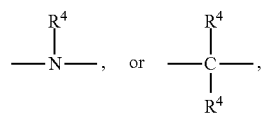

wherein each $R^4$ independently represents H or alkyl having from 1 to 18 carbon atoms, or taken together any two of $R^1$, $R^2$, $R^3$, or $R^4$ form a ring; and b) contacting the curable composition with at least one oxide of copper, thereby causing at least partial curing of the curable composition.

In a second embodiment, the present disclosure provides a method according to the first embodiment, wherein the curable composition is essentially free of organic peroxide.

In a third embodiment, the present disclosure provides a method according to the first embodiment, wherein the curable composition comprises an organic peroxide.

In a fourth embodiment, the present disclosure provides a method according to the first to third embodiments, wherein the curable composition further comprises a quaternary ammonium halide.

In a fifth embodiment, the present disclosure provides a method according to the first to fourth embodiments, wherein the beta-dicarbonyl compound comprises a 1,3-dialkylbarbituric acid.

In a sixth embodiment, the present disclosure provides a method according to the first to fourth embodiments, wherein the beta-dicarbonyl compound comprises at least one of 2-methyl-1,3-cyclohexanedione, dimedone, or dimethyl acetylsuccinate.

In a seventh embodiment, the present disclosure provides a method according to the first to sixth embodiments, wherein the at least one free-radically polymerizable compound comprises a free-radically polymerizable polyfunctional (meth)acrylate.

In an eighth embodiment, the present disclosure provides a method of forming an article, the method comprising:
providing a first substrate having a surface, wherein at least a portion of the surface of the first substrate comprises at least one oxide of copper; and
contacting a curable composition with the at least one oxide of copper whereby the curable composition at least partially cures, and wherein the curable composition comprises:
at least one free-radically polymerizable compound; and
a beta-dicarbonyl compound represented by the formula

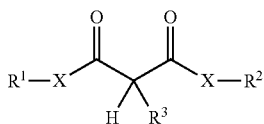

or a salt thereof, wherein:
$R^1$ and $R^2$ independently represent hydrocarbyl or substituted-hydrocarbyl group having from 1 to 18 carbon atoms;
$R^3$ represents hydrogen, or a hydrocarbyl or substituted-hydrocarbyl group having from 1 to 18 carbon atoms; and
each X independently represents O, S,

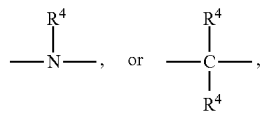

wherein each $R^4$ independently represents H or alkyl having from 1 to 18 carbon atoms, or taken together any two of $R^1$, $R^2$, $R^3$, or $R^4$ form a ring.

In a ninth embodiment, the present disclosure provides a method according to the eighth embodiment, further comprising: contacting the curable composition with a second substrate such that the curable composition is at least partially disposed between the first substrate and the second substrate.

In a tenth embodiment, the present disclosure provides a method according to the ninth embodiment, wherein the second substrate comprises glass.

In an eleventh embodiment, the present disclosure provides a method according to any one of the eighth to tenth embodiments, wherein the first substrate further comprises glass.

In a twelfth embodiment, the present disclosure provides a method according to any one of the eighth to eleventh embodiments, wherein the at least one oxide of copper comprises at least a portion of a printed circuit.

In a thirteenth embodiment, the present disclosure provides a method according to any one of the eighth to twelfth embodiments, wherein the at least one oxide of copper is substantially optically transparent.

In a fourteenth embodiment, the present disclosure provides a method according to any one of the eighth to thirteenth embodiments, wherein the article comprises an electronic display device.

In a fifteenth embodiment, the present disclosure provides a method according to any one of the eighth to fourteenth embodiments, wherein the curable composition is essentially free of organic peroxide.

In a sixteenth embodiment, the present disclosure provides a method according to any one of the eighth to fourteenth embodiments, wherein the curable composition comprises an organic peroxide.

In a seventeenth embodiment, the present disclosure provides a method according to any one of the eighth to sixteenth embodiments, wherein the curable composition further comprises a quaternary ammonium halide.

In an eighteenth embodiment, the present disclosure provides a method according to any one of the eighth to seventeenth embodiments, wherein the beta-dicarbonyl compound comprises a 1,3-dialkylbarbituric acid, or a derivative thereof.

In a nineteenth embodiment, the present disclosure provides a method according to any one of the eighth to seventeenth embodiments, wherein the beta-dicarbonyl compound comprises at least one of 2-methyl-1,3-cyclohexanedione, dimedone, or dimethyl acetylsuccinate.

In a twentieth embodiment, the present disclosure provides a method according to any one of the eighth to seventeenth embodiments, wherein the at least one free-radically polymerizable compound comprises a free-radically polymerizable polyfunctional (meth)acrylate.

In a twenty-first embodiment, the present disclosure provides an article comprising:
a first substrate having a surface, wherein at least a portion of the surface of the first substrate comprises at least one oxide of copper; and
a reaction product of components comprising:
the at least one oxide of copper;
at least one free-radically polymerizable compound; and
a beta-dicarbonyl compound represented by the formula

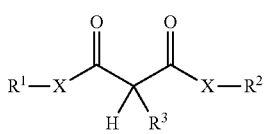

or a salt thereof, wherein:
R¹ and R² independently represent hydrocarbyl or substituted-hydrocarbyl group having from 1 to 18 carbon atoms;
R³ represents hydrogen, or a hydrocarbyl or substituted-hydrocarbyl group having from 1 to 18 carbon atoms; and
each X independently represents O, S,

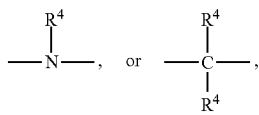

wherein each R⁴ independently represents H or alkyl having from 1 to 18 carbon atoms, or taken together any two of R¹, R², R³, or R⁴ form a ring.

In a twenty-second embodiment, the present disclosure provides an article according to the twenty-first embodiment, wherein the reaction product contacts a second substrate, and wherein the reaction product is at least partially disposed between the first substrate and the second substrate.

In a twenty-third embodiment, the present disclosure provides an article according to the twenty-second embodiment, wherein the second substrate comprises glass.

In a twenty-fourth embodiment, the present disclosure provides an article according to any one of the twenty-first to twenty-third embodiments, wherein the first substrate further comprises glass.

In a twenty-fifth embodiment, the present disclosure provides an article according to any one of the twenty-first to twenty-fourth embodiments, wherein the at least one oxide of copper comprises at least a portion of a printed circuit.

In a twenty-sixth embodiment, the present disclosure provides an article according to any one of the twenty-first to twenty-fifth embodiments, wherein the at least one oxide of copper is substantially optically transparent.

In a twenty-seventh embodiment, the present disclosure provides an article according to any one of the twenty-first to twenty-sixth embodiments, wherein the article comprises an electronic display device.

In a twenty-eighth embodiment, the present disclosure provides an article according to any one of the twenty-first to twenty-seventh embodiments, wherein the components are essentially free of organic peroxide.

In a twenty-ninth embodiment, the present disclosure provides an article according to any one of the twenty-first to twenty-seventh embodiments, wherein the components further comprise an organic peroxide.

In a thirtieth embodiment, the present disclosure provides an article according to any one of the twenty-first to twenty-ninth embodiments, wherein the components further comprise a quaternary ammonium halide.

In a thirty-first embodiment, the present disclosure provides an article according to any one of the twenty-first to thirtieth embodiments, wherein the beta-dicarbonyl compound comprises a 1,3-dialkylbarbituric acid, or a derivative thereof.

In a thirty-second embodiment, the present disclosure provides an article according to any one of the twenty-first to thirtieth embodiments, wherein the beta-dicarbonyl compound comprises at least one of 2-methyl-1,3-cyclohexanedione, dimedone, or dimethyl acetylsuccinate.

In a thirty-third embodiment, the present disclosure provides an article according to any one of the twenty-first to thirty-second embodiments, wherein the at least one free-radically polymerizable compound comprises a free-radically polymerizable polyfunctional (meth)acrylate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following materials were used in the Examples:
BENZOFLEX 9-88 plasticizer, obtained from Eastman Chemical Co., Kingsport, Tenn.;
CAB-O-SIL TS-720 hydrophobic treated fumed silica, obtained from Cabot Corp., Boston, Mass.;
1-benzyl-5-phenylbarbituric acid, available from TCI (Shanghai) Development Co. Ltd.
t-butyl 3,5,5-trimethylperoxyhexanoate, available from Acros Organics, Antwerp, Belgium;
tetrahydrofurfuryl methacrylate (THFMA), obtained from Sartomer Co., Exton, Pennsylvania;
2-hydroxyethyl methacrylate (HEMA), obtained from Alfa Aesar, Ward Hill, Massachusetts; and
ethoxylated bisphenol-A dimethacrylate (BisGMA), obtained as SR540 from Sartomer Co.

Preparation of Base Resins 1-6
Base Resin 1 was THFMA.
Base Resin 2 was HEMA.
Base Resin 3 was BisGMA.
Base Resin 4 was prepared as follows: 95 weight percent of THFMA and 5 weight percent of a benzyltributylammonium chloride stock solution (5 weight percent of benzyltributylammonium chloride in 2-hydroxyethyl methacrylate) was combined. The stock solution was prepared by adding the salt to the methacrylate monomer and shaking until it was dissolved.
Base Resin 5 was prepared as follows: 95 weight percent of HEMA and 5 weight percent of a benzyltributylammonium chloride stock solution (5 weight percent of benzyltributylammonium chloride in 2-hydroxyethyl methacrylate) was combined. The stock solution was prepared by adding the salt to the methacrylate monomer and shaking until it was dissolved.
Base Resin 6 was prepared as follows: 95 weight percent of BisGMA and 5 weight percent of a benzyltributylammonium chloride stock solution (5 weight percent of benzyltributylammonium chloride in 2-hydroxyethyl methacrylate) was combined. The stock solution was prepared by adding the salt to the methacrylate monomer and shaking until it was dissolved.

Preparation of Compositions A-E
Each composition was composed of a diluent, a thixotropic agent, an initiator molecule, and optionally an organic peroxide. The components of the compositions were mixed in cups using a MAX 100 DAC SPEEDMIXER from FlackTek Inc., Landrum, S.C., for 30 seconds at 2,000 revolutions per minute (rpm) and 30 seconds at 2,500 rpm. The cups were checked to ensure the initiator molecule and the thixotrope were fully dispersed. The formulations of Compositions A-E are reported in Table 1 (below).

TABLE 1

| COMPONENT | COMPOSITION, weight percent of components | | | | |
|---|---|---|---|---|---|
| | A | B | C | D | E |
| BENZOFLEX 9-88 | 86 | 84 | 84 | 84 | 84 |
| CAB-O-SIL TS720 | 2.3 | 2.5 | 2.5 | 2.5 | 2.5 |
| 1-benzyl-5-phenylbarbituric acid | 11.7 | 11 | 0 | 0 | 0 |
| t-butylperoxy-3,5,5-trimethylhexanoate | 0 | 2.5 | 2.5 | 2.5 | 2.5 |
| 2-methyl-1,3-cyclohexanedione | 0 | 0 | 11 | 0 | 0 |
| dimedone | 0 | 0 | 0 | 11 | 0 |
| dimethyl acetylsuccinate | 0 | 0 | 0 | 0 | 11 |

Examples 1-3 and Comparative Examples A-C

For Examples 1-3, the indicated Base Resins (4 mL) and Composition A (0.4 mL) were mixed in a small vial. Approximately 10 cm of 20 AWG bare copper wire was coiled with a diameter of approximately 8.25 mm and added to the vial. Full cure of the resin was established when the material was fully solidified and unable to flow. The copper wire had been stored in air and was used without cleaning. ESCA (Electron Spectroscopy for Chemical Analysis) analysis confirmed the presence of a copper oxide layer on the surface of the copper wire.

Comparative Examples A-C correspond to Examples 1-3, respectively, with the exception that the copper wire was omitted.

The cure times are reported in Table 2 (below).

TABLE 2

| | BASE RESIN | CURE TIME, minutes |
|---|---|---|
| EXAMPLE 1 | 4 | 25 |
| COMPARATIVE EXAMPLE A | 4 | 180 |
| EXAMPLE 2 | 5 | 18 |
| COMPARATIVE EXAMPLE B | 5 | 60 |
| EXAMPLE 3 | 6 | 60 |
| COMPARATIVE EXAMPLE C | 6 | 60 |

A small amount of monomer (less than about 5 weight percent) was still visible after 24 hours in samples that did not contain the copper wire.

Examples 4-6 and Comparative Examples D-F

For Examples 4-6, the indicated Base Resins (4 mL) and Composition B (0.4 mL) were mixed in a small vial. Approximately 10 cm of 20 AWG bare copper wire was coiled with a diameter of approximately 8.25 mm and added to the vial. The copper wire had been stored in air and was used without cleaning. ESCA analysis confirmed the presence of a copper oxide layer on the surface of the copper wire. Full cure of the resin was established when the material was fully solidified and unable to flow.

Comparative Examples D-F correspond to Examples 4-6, respectively, with the exception that the copper wire was omitted.

The cure times are reported in Table 3 (below).

TABLE 3

| | BASE RESIN | CURE TIME, minutes |
|---|---|---|
| EXAMPLE 4 | 4 | 20 |
| COMPARATIVE EXAMPLE D | 4 | 180 |
| EXAMPLE 5 | 5 | 9 |
| COMPARATIVE EXAMPLE E | 5 | 60 |
| EXAMPLE 6 | 6 | 30 |
| COMPARATIVE EXAMPLE F | 6 | 60 |

A small amount of monomer (less than about 5 weight percent) was still visible after 24 hours in samples that did not contain the copper wire.

Examples 7-10 and Comparative Examples G-H

For Examples 7-10, the indicated Base Resins (4 mL) and Compositions (0.4 mL) were mixed in a small vial. For Examples 7-10, approximately 10 cm of 20 AWG bare copper wire was coiled with a diameter of approximately 8.25 mm and added to the vial. The copper wire had been stored in air and was used without cleaning. ESCA analysis confirmed the presence of a copper oxide layer on the surface of the copper wire.

In Comparative Examples G-H the copper wire was omitted. Full cure of the resin was established when the material was fully solidified and unable to flow.

Cure times are reported in Table 4 (below).

TABLE 4

| | COPPER WIRE PRESENT | BASE RESIN | COMPOSITION | CURE TIME, MINUTES |
|---|---|---|---|---|
| EXAMPLE 7 | yes | 1 | A | 70 |
| EXAMPLE 8 | yes | 1 | B | 50 |
| COMPARATIVE EXAMPLE G | no | 1 | B | >500 |
| EXAMPLE 9 | yes | 3 | A | 90 |
| EXAMPLE 10 | yes | 3 | B | 90 |
| COMPARATIVE EXAMPLE H | no | 3 | B | 140 |

A small amount of monomer (less than about 5 weight percent) was still visible after 24 hours in samples that did not contain the copper wire.

Examples 11-16

For Examples 11-16, the indicated Base Resins (4 mL) and Compositions (0.4 mL) were mixed in a small vial. For Examples 11-14, 0.1 g of powdered cuprous oxide was added to the vial. In Examples 15 and 16, 0.1 g of cupric oxide (13 weight percent on alumina) was added to the vial.

Full cure of the resin was established when the material was fully solidified and unable to flow.

The cure times are reported in Table 5 (below).

TABLE 5

| | COPPER OXIDE TYPE | BASE RESIN | COMPOSITION | CURE TIME, minutes |
|---|---|---|---|---|
| EXAMPLE 11 | Cuprous | 4 | A | 20 |
| EXAMPLE 12 | Cuprous | 4 | B | 12 |
| EXAMPLE 13 | Cuprous | 6 | A | 4 |
| EXAMPLE 14 | Cuprous | 6 | B | 3 |
| EXAMPLE 15 | Cupric | 4 | A | 20 |
| EXAMPLE 16 | Cupric | 4 | B | 21 |

The powdered cuprous oxide remained suspended throughout polymerization of the methacrylate monomers if shaken by hand. Cuprous oxide particles settled to the bottom of a vial over the course of an hour if placed in the base resin. The cupric oxide particle would not disperse within the base resin. However, the mixtures of the base resin and accelerators cured completely while the cupric oxide particles remained on the bottom of the vial.

Examples 17-28 and Comparative Examples I-J

For Examples 17-28, the indicated Base Resins (4 mL) and Composition B (0.4 mL) were mixed in a small vial. For Examples 17-20, three drops of the curable mixture were placed on a 0.125 inch (0.32 cm) thick rectangular copper bar and then covered with a glass cover slip. ESCA analysis confirmed the presence of a copper oxide layer on the surface of the copper bar.

For Examples 21-28, three drops of the curable mixture were placed on a glass substrate that had been coated with a thin copper layer and then covered with a glass cover slip. ESCA (Electron Spectroscopy for Chemical Analysis) analysis confirmed the presence of a copper oxide layer on the surface of the thin copper layer.

PGO glass slides were cleaned by soaking for 30-60 minutes in ALCONOX LIQUI-NOX detergent solution from Alconox, Inc., White Plains, N.Y., then scrubbed with a bristle brush while rinsing under warm tap water, followed by a final rinse with deionized water. These slides were allowed to air dry while covered to prevent dust accumulation on the surface. Elemental copper was then sputter-coated onto the glass slide to the desired thickness and the coated substrates were stored in air for 24 hours to create a copper oxide surface layer. The thickness of the initial copper coating was 100 nm for Examples 21-24 and 1 nm for Examples 25-28. In Comparative Examples I-J, the copper coating was omitted. Cure time for each example was established when the glass cover slip could be pushed by hand and not move across the substrate.

The cure times are reported in Table 6 (below).

TABLE 6

| | COPPER LAYER THICKNESS | BASE RESIN | CURE TIME, minutes |
|---|---|---|---|
| EXAMPLE 17 | 0.64 cm | 1 | 12 |
| EXAMPLE 18 | 0.64 cm | 3 | 5 |
| EXAMPLE 19 | 0.64 cm | 4 | 10 |
| EXAMPLE 20 | 0.64 cm | 6 | 3 |
| EXAMPLE 21 | 100 nm | 1 | 20 |
| EXAMPLE 22 | 100 nm | 3 | 6 |
| EXAMPLE 23 | 100 nm | 4 | 12 |
| EXAMPLE 24 | 100 nm | 6 | 3 |
| EXAMPLE 25 | 1 nm | 1 | 11 |
| EXAMPLE 26 | 1 nm | 3 | 4 |
| EXAMPLE 27 | 1 nm | 4 | 11 |
| EXAMPLE 28 | 1 nm | 6 | 3 |
| COMPARATIVE EXAMPLE I | not determined | 1 | 30 |
| COMPARATIVE EXAMPLE J | not determined | 4 | 35 |

Mixtures of the Base Resin and Composition that was not under the glass cover slip polymerized at a reduced rate. The mixture could be wiped off cleanly, leaving only the material under the cover slip adhered in place.

Examples 29-34 and Comparative Examples K-M

For Examples 29-30, the indicated Base Resins (4 mL) and Compositions (0.4 mL) were mixed in a small vial. Approximately 10 cm of 20 AWG bare copper wire was coiled with a diameter of approximately 8.25 mm and added to the vial. The copper wire had been stored in air and was used without cleaning. ESCA analysis confirmed the presence of a copper oxide layer on the surface of the copper wire.

In Comparative Examples K-M the copper wire was omitted. Full cure of the resin was established when the material was fully solidified and unable to flow.

The cure times are reported in Table 7 (below), wherein "NO CURE" means not cured after 14 days.

TABLE 7

| | COPPER WIRE PRESENT | BASE RESIN | COMPOSITION | CURE TIME, minutes |
|---|---|---|---|---|
| EXAMPLE 29 | yes | 4 | C | 180 |
| COMPARATIVE EXAMPLE K | no | 4 | C | no cure |
| EXAMPLE 30 | yes | 4 | D | 180 |
| COMPARATIVE EXAMPLE L | no | 4 | D | no cure |
| EXAMPLE 31 | yes | 4 | E | 150 |
| COMPARATIVE EXAMPLE M | no | 4 | E | no cure |
| EXAMPLE 32 | yes | 1 | C | no cure |
| EXAMPLE 33 | yes | 1 | D | no cure |
| EXAMPLE 34 | yes | 1 | E | no cure |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method comprising:
   a) providing a curable composition comprising:
      at least one free-radically polymerizable compound; and a beta-dicarbonyl compound represented by the formula

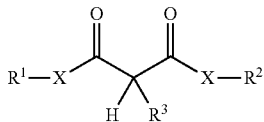

or a salt thereof, wherein:
  $R^1$ and $R^2$ independently represent hydrocarbyl or substituted-hydrocarbyl group having from 1 to 18 carbon atoms;
  $R^3$ represents hydrogen, or a hydrocarbyl or substituted-hydrocarbyl group having from 1 to 18 carbon atoms; and
  each X independently represents O, S,

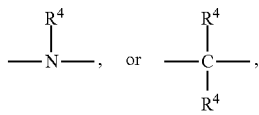

wherein each $R^4$ independently represents H or alkyl having from 1 to 18 carbon atoms, or taken together any two of $R^1$, $R^2$, $R^3$, or $R^4$ form a ring; and b) contacting the curable composition with at least one oxide of copper, thereby causing at least partial curing of the curable composition.

2. The method of claim 1, wherein the curable composition is essentially free of organic peroxide.

3. The method of claim 1, wherein the curable composition comprises an organic peroxide.

4. The method of claim 1, wherein the curable composition further comprises a quaternary ammonium halide.

5. The method of claim 1, wherein the beta-dicarbonyl compound comprises a 1,3-dialkylbarbituric acid.

6. The method of claim 1, wherein the beta-dicarbonyl compound comprises at least one of 2-methyl-1,3-cyclohexanedione, dimedone, or dimethyl acetylsuccinate.

7. The method of claim 1, wherein the at least one free-radically polymerizable compound comprises a free-radically polymerizable polyfunctional (meth)acrylate.

8. A method of forming an article, the method comprising:
  providing a first substrate having a surface, wherein at least a portion of the surface of the first substrate comprises at least one oxide of copper; and
  contacting a curable composition with the at least one oxide of copper whereby the curable composition at least partially cures, and wherein the curable composition comprises:
    at least one free-radically polymerizable compound; and
    a beta-dicarbonyl compound represented by the formula

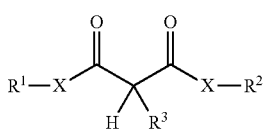

or a salt thereof, wherein:
  $R^1$ and $R^2$ independently represent hydrocarbyl or substituted-hydrocarbyl group having from 1 to 18 carbon atoms;
  $R^3$ represents hydrogen, or a hydrocarbyl or substituted-hydrocarbyl group having from 1 to 18 carbon atoms; and
  each X independently represents O, S,

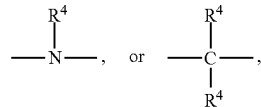

wherein each $R^4$ independently represents H or alkyl having from 1 to 18 carbon atoms, or taken together any two of $R^1$, $R^2$, $R^3$, or $R^4$ form a ring.

9. The method of claim 8, further comprising: contacting the curable composition with a second substrate such that the curable composition is at least partially disposed between the first substrate and the second substrate.

10. The method of claim 8, wherein the second substrate comprises glass.

11. The method of claim 8, wherein the first substrate further comprises glass.

12. The method of claim 8, wherein the at least one oxide of copper comprises at least a portion of a printed circuit.

13. The method of claim 8, wherein the at least one oxide of copper is substantially optically transparent.

14. The method of claim 8, wherein the article comprises an electronic display device.

15. An article comprising:
  a first substrate having a surface, wherein at least a portion of the surface of the first substrate comprises at least one oxide of copper; and
  a reaction product of components comprising:
    the at least one oxide of copper;
    at least one free-radically polymerizable compound; and
    a beta-dicarbonyl compound represented by the formula

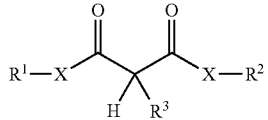

or a salt thereof, wherein:
  $R^1$ and $R^2$ independently represent hydrocarbyl or substituted-hydrocarbyl group having from 1 to 18 carbon atoms;
  $R^3$ represents hydrogen, or a hydrocarbyl or substituted-hydrocarbyl group having from 1 to 18 carbon atoms; and
  each X independently represents O, S,

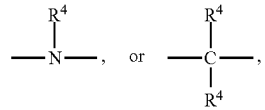

wherein each $R^4$ independently represents H or alkyl having from 1 to 18 carbon atoms, or taken together any two of $R^1$, $R^2$, $R^3$, or $R^4$ form a ring.

16. The article of claim 15, wherein the reaction product contacts a second substrate, and wherein the reaction product is at least partially disposed between the first substrate and the second substrate.

17. The article of claim 15, wherein the second substrate comprises glass.

18. The article of claim 15, wherein the at least one oxide of copper comprises at least a portion of a printed circuit.

19. The article of claim 15, wherein the at least one oxide of copper is substantially optically transparent.

20. The article of claim 15, wherein the article comprises an electronic display device.

* * * * *

UNITED STATES PATENT AND TRADEMARK OFFICE
CERTIFICATE OF CORRECTION

PATENT NO. : 9,957,408 B2  
APPLICATION NO. : 14/776305  
DATED : May 1, 2018  
INVENTOR(S) : Zachary Thompson Page 1 of 1

It is certified that error appears in the above-identified patent and that said Letters Patent is hereby corrected as shown below:

On the Title Page

Column 2 (Abstract)  
Line 11, Delete "R4" and insert -- $R^4$ --, therefor.

In the Specification

Column 4  
Line 60, Delete "tricyclodecane-dimethanol" and insert -- tricyclodecanedimethanol --, therefor.

Column 12  
Line 28, Delete "CAB-0-SIL" and insert -- CAB-O-SIL --, therefor.

Signed and Sealed this  
Twenty-ninth Day of January, 2019

Andrei Iancu  
*Director of the United States Patent and Trademark Office*